March 7, 1961     P. M. BECK     2,973,541
DENTAL MIRROR WIPER ATTACHMENT
Filed Feb. 5, 1958
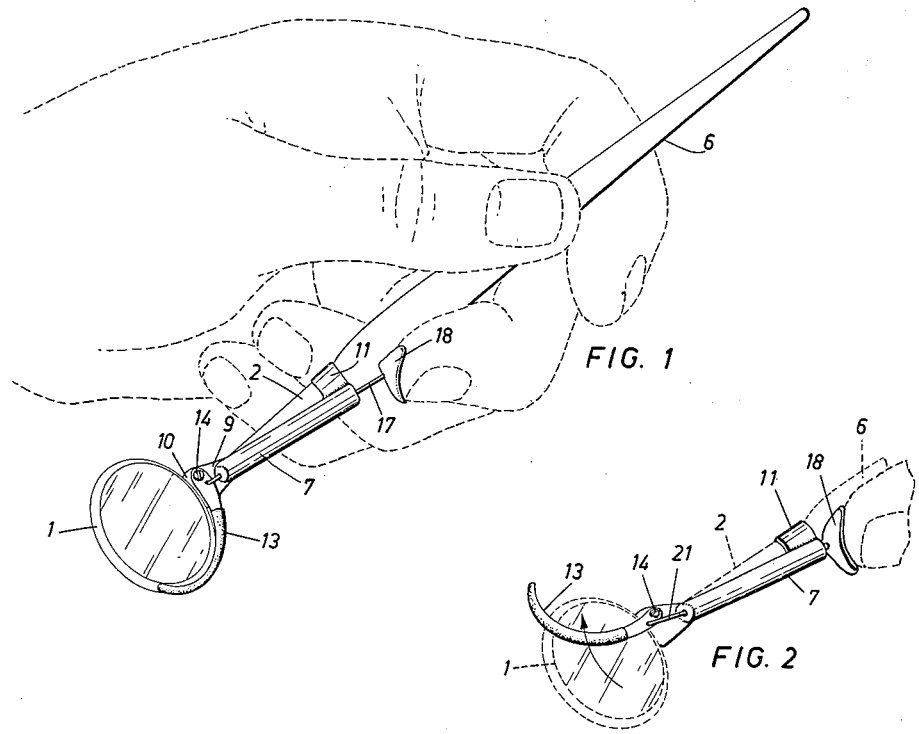
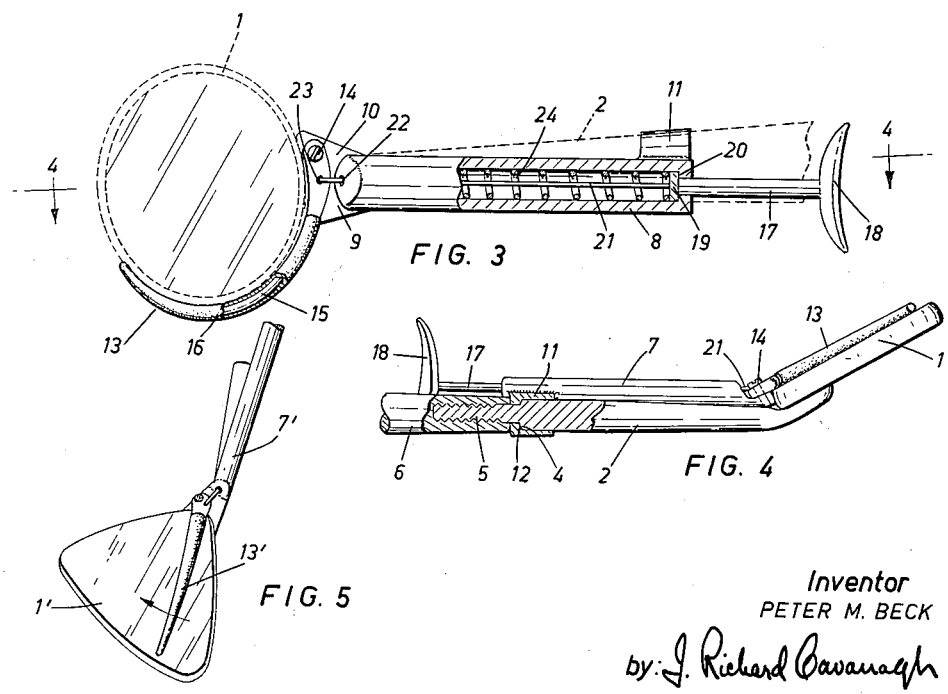
Inventor
PETER M. BECK
by: J. Richard Cavanagh
Patent Agent

United States Patent Office 2,973,541
Patented Mar. 7, 1961

2,973,541

DENTAL MIRROR WIPER ATTACHMENT

Peter Matthew Beck, 49 Leacroft Crescent,
Don Mills, Ontario, Canada

Filed Feb. 5, 1958, Ser. No. 713,491

2 Claims. (Cl. 15—250.15)

This invention relates to a mirror cleaning device for use with dental hand mirrors.

The use of small mirrors on a conveniently disposed shank or handle is well established in dental work. Their use presents certain problems in that they have to be small enough to be moved around within the patient's mouth at the same time with other equipment such as a drill or pick etc. Because of their small size vision is easily obstructed by condensation of the patient's breath, drilling fragments and moisture from one source or another. This problem has been vastly increased by the tendency towards the use of high speed drilling equipment. The use of high speed drills requires the use of cooling means, usually water. The result is that the dentist's view in the dental mirror is constantly being obstructed by particles and moisture. This is particularly true when one of the upper teeth is being worked upon. Due to the moisture in the patient's mouth the particles tend to cling to the mirror and it has to be frequently withdrawn and cleaned. This necessitates stopping the drilling action and causes unnecessary delays and inconvenience to both the operator and patient.

Attempts to clean the mirror have been made by directing an air jet on the mirror to blow away the drilling fragments and the moisture. Such methods present disadvantages in that the air stream also has to be fed into the patient's mouth and directed onto the mirror. Not only does it necessitate an awkward attachment to the mirror and another lead into the patient's mouth, but the lead hampers the operator's manipulation of the mirror and the air stream causes discomfort to the patient.

It is therefore an object of this invention to provide a simple compact attachment for quickly cleaning a dental mirror which requires no additional source of air or water supply.

It is also an object of this invention to provide a dental mirror cleaning device which can be operated without necessarily removing the mirror from the patient's mouth.

It is a further object of the invention to provide a dental mirror cleaning device which can be easily operated by the dentist whilst maintaining his hold on the mirror in an operating position.

This invention generally concerns a cleaning attachment for a dental hand mirror having a mirror element rigidly extending at an angle from a rigid supporting shank and comprising a support member; means for mounting said support member on said shank; a bracket on said support member disposed thereby adjacent said mirror element; a wiper member; means pivotally mounting said member on said bracket to dispose said member for pivotal swinging motion over said mirror element; a finger engageable actuating member slidably supported by said mounting; and means connecting said actuating member to said wiper member adjacent the pivotal mounting of the latter for effecting a wiping action of said member over said mirror upon motion of said actuating member by finger motion of an operator.

Further objects and advantages of the invention will become apparent from a consideration of the following description in conjunction of the figures in which Figure 1 shows a perspective view of a dental hand mirror with an attachment of the invention, and showing the operator's hand in dotted lines.

Figure 2 shows a perspective view of the attachment as it is operated by an operator with the dental mirror and operator's finger in dotted lines.

Figure 3 shows a partially broken away plan view of the attachment with the dental mirror in dotted lines.

Figure 4 is a partial sectional view along the lines 4—4 in Figure 3.

Figure 5 shows a partial view of another embodiment of the invention.

In Figure 1 a circular mirror 1 is rigidly mounted upon an angulated mounting shank 2 in the conventional manner. Shank 2 is tapered and is provided with a shoulder 4 (see Figure 4), the upper end 5 is of reduced diameter and suitably threaded to receive handle 6.

The cleaning attachment has a canted support member 7. This support member 7 consists of a tubular member 8 with an attached flattened bracket or shoulder 9 which in the assembled position abuts the edge of the mirror 1. The bracket 9 has a supporting surface 10 substantially parallel with the surface of mirror 1.

The upper end of the canted support member 7 is provided with an attaching collar bracket 11, the axis of the collar bracket 11 being at a slight angle to the axis of tubular member 8 for reasons which will become apparent as the description proceeds. The collar bracket 11 is provided with an internal shoulder 12 (see Figure 4) which abuts shoulder 4 in the assembled position. When assembled, the axis of the collar bracket 11 and shaft 2 are coincident and the support member 7 is thus canted at an angle to the axis of the shank 2 as shown in Figure 1. Shoulder 12 is held firmly against shoulder 4 by means of handle 6 threadably supported on end 5 of shank 2, and shoulder 9 abuts the edge of mirror 1 maintaining the cleaning attachment firmly in position.

Mirror wiping means 13 is pivotally attached at one end to shoulder 9 by pivot means 14, which may be of any convenient form such as a small screw. The mirror wiping means 13 may comprise a suitably shaped wiper bar 15 with a rubber or plastic outer sleeve 16 mounted thereon. In the embodiment shown in Figure 1, the arm 15 is curved so as to lie in its inoperative position along the edge of the mirror 1 without obstructing the operator's vision. It is not essential that the wiper bar 15 be provided with a rubber or plastic outer sleeve 16 but such a sleeve ensures more effective wiping of mirror. The mirror wiping means 13 is operated by an actuating member or plunger 17 supported by tubular member 8. The outer end of plunger 17 terminates in a head portion 18 adapted to be easily operated with one finger by an operator. The inner end of plunger 17 is provided with a flange 19 movable within a tubular member 8 and designed to abut shoulder 20 formed in the end of tubular member 8. Flange 19 is connected to flexible means 21 such as a wire which in turn passes through hole 22 formed in the lower end of the tubular member 8 and has its outer end connected to a point 23 on the wiper bar.

The plunger 17 is spring loaded by means of spring 24 to return to its outer position. Spring 24 at its lower end abuts the end of tubular member 8 and at its upper end abuts flange 19. When plunger 17 is depressed the motion is transferred through connecting means 21 causing wiper arm 13 to rotate about pivot point 14 and wipe the surface of the mirror 1. When the plunger is released spring 24 acts to return the components to their inoperative position.

The embodiment shown in Figure 5 shows a straight wiping member 13' in conjunction with a fan shaped mirror 1'. The operation of the wiping means is effected in the same manner as above described.

The support member 7 is shown arranged to form an angle with the axis of the mirror holder as described. Usually the mirror is held in the left hand and the angle which the support member 7 makes with the handle 6 allows the operator to depress the head 18 of plunger 17 with the second finger without changing his grip on the mirror (see Figure 1).

Obviously the angle which the support member 7 bears to the axis of the handle 2 may be altered without departing from the scope of the invention, and the attachment may be designed to be operated by left or right handed persons. It will be understood that the invention is not to be limited to the exact construction shown and described but that modifications may be made without departing from the scope of the invention as defined in the appended claims.

What I claim as my invention is:

1. A cleaning attachment for a dental hand mirror having a mirror element rigidly extending from a rigid supporting shank and comprising: a tubular support member having a longitudinal axis; means for mounting said tubular support member upon said shank at a slight angle thereto; a bracket on said tubular support member and disposed thereby adjacent said mirror element; a wiper element; an elastomer outer sleeve disposed upon said wiper element; means pivotally mounting said wiper element on said bracket substantially off said longitudinal axis to dispose said wiper element and outer sleeve for pivotal swinging motion over said mirror element; a plunger slidable within said tubular support member; a finger engageable head portion on said plunger; flexible wire means connecting said plunger to said wiper element adjacent the longitudinal axis and removed from the pivotal mounting of the wiper for effecting a wiping action of said wiper element and outer sleeve over said mirror upon motion of said finger engageable head portion by an operator; and spring return means within said tubular support member engaging said plunger for effecting return motion upon release of said finger engageable head portion by the operator.

2. A cleaning attachment for a dental hand mirror having a mirror element rigidly extending from a rigid supporting shank and comprising: a tubular support member; first bracket means on said tubular support member firmly engageable with said shank so as to dispose said tubular support member substantially adjacent and at a slight angle to said shank; second bracket means on said tubular support member and disposed thereby adjacent said mirror element; a wiper element; an elastomer outer sleeve disposed upon said wiper element; means pivotally mounting said wiper element on said bracket to dispose said wiper element and outer sleeve for pivotal swinging motion over said mirror element; a plunger slidable within said tubular support member; a finger engageable head portion on said plunger; flexible wire means connecting said plunger to said wiper element adjacent the pivotal mounting of the latter for effecting a wiping action of said wiper element and outer sleeve over said mirror upon motion of said finger engageable head portion by an operator; and spring return means within said tubular support member engaging said plunger for effecting return motion upon release of said finger engageable head portion by the operator.

References Cited in the file of this patent

UNITED STATES PATENTS

| | | |
|---|---|---|
| 2,329,757 | Greenfield | Sept. 21, 1943 |
| 2,722,707 | Musselman | Nov. 8, 1955 |
| 2,809,430 | Barber | Oct. 15, 1957 |